F. W. BEAUCHAMP.
GLARE GUARD FOR HEADLIGHTS.
APPLICATION FILED AUG. 24, 1914.
1,148,650.
Patented Aug. 3, 1915.
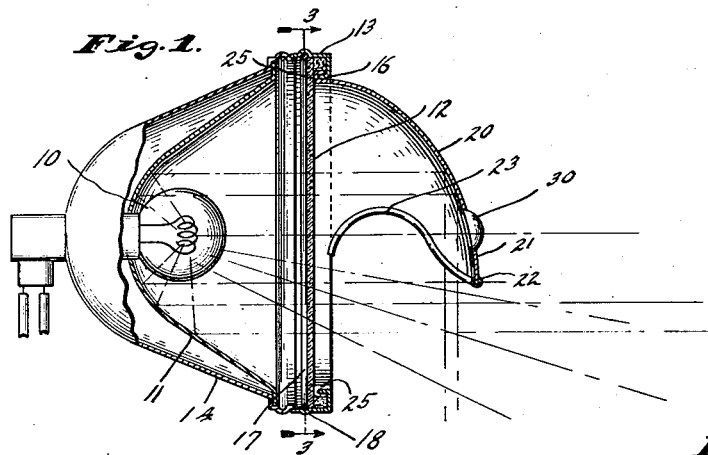
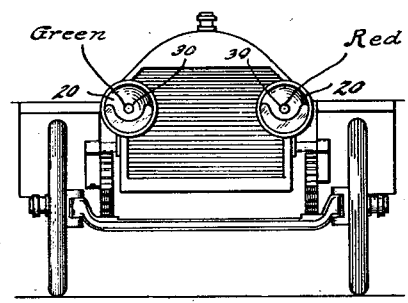
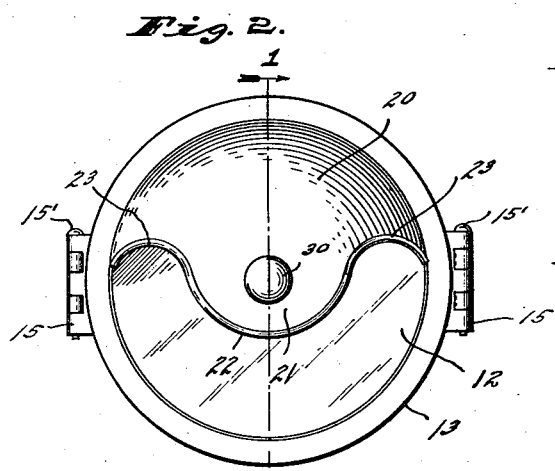
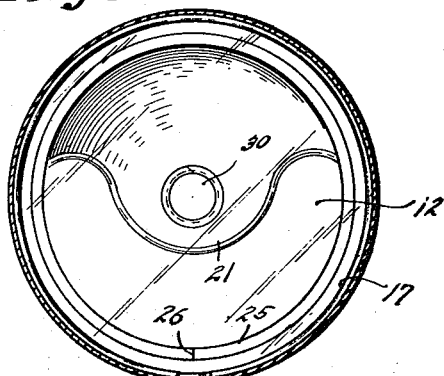
WITNESSES:
INVENTOR
Frederick W. Beauchamp,
BY
Hood & Schley
ATTORNEYS

UNITED STATES PATENT OFFICE.

FREDERICK W. BEAUCHAMP, OF INDIANAPOLIS, INDIANA.

GLARE-GUARD FOR HEADLIGHTS.

1,148,650.   Specification of Letters Patent.   Patented Aug. 3, 1915.

Application filed August 24, 1914. Serial No. 858,194.

*To all whom it may concern:*

Be it known that I, FREDERICK W. BEAUCHAMP, a citizen of the United States, residing at Indianapolis, in the county of Marion and State of Indiana, have invented a new and useful Glare-Guard for Headlights, of which the following is a specification.

The ordinary automobile headlight, when sufficiently brilliant to give the desired light on the road ahead, is often absolutely blinding to the eyes of the drivers of approaching cars and pedestrians.

It is the object of my present invention to avoid this blinding effect, while at the same time preserving the full lighting of the road ahead and at the sides and indeed even increasing the lighting of that part of the road which is closely ahead.

It is my further object to provide means which in case one of the headlights is extinguished will indicate which one is still lighted, so that proper allowance may be made by others for the passage of the body of the car.

In carrying out my invention, I provide in front of each headlight a hood or glare guard which extends well forward of the lamp and covers the upper part thereof from the top to a point somewhat below the center directly in front though somewhat above the center at the sides, whereby those direct rays from the lights which would project sufficiently high to strike the eyes of pedestrians or approaching drivers are cut off and deflected downward to light the road immediately ahead, while the lower rays are projected without hindrance to light up the road ahead, and whereby certain oblique rays toward the sides are permitted to pass without hindrance for the lighting of the side of the road; and I preferably mount in this hood directly in front of the center of the lamp a translucent window, as of red or green glass (red for the left hand lamp and green for the right) which will indicate to persons ahead which lamp is extinguished in case one of them happens to be. I also provide a special means for mounting my improved hood on existing automobile headlights.

The accompanying drawings illustrate my invention.

Figure 1 is a vertical axial section through a headlight embodying my invention, being taken substantially on the line 1—1 of Fig. 2; Fig. 2 is a front elevation of such headlight; Fig. 3 is a section on the line 3—3 of Fig. 1; and Fig. 4 is a front view of an automobile equipped with headlights embodying my invention.

The headlight itself may be of any desired type, and usually comprises a suitable source of illumination 10, here shown as an electric lamp, mounted at the focus of a parabolic reflector 11 so as to throw the rays forward through a suitable glass disk 12, either flat or lenticular. Such glass disk 12 is usually mounted in a swinging door 13 connected to the main body 14 of the lamp by a hinge 15, or by two opposite hinges the pin 15' of either of which may be drawn to permit the door to swing about the other hinge. The door 13 has at the front an inwardly projecting flange 16 against which the glass 12 is clamped by any suitable clamping device, here shown as a spring ring 17 which springs outward into a groove 18 in the inner surface of the door frame 13.

My improved hood is conveniently made of sheet metal, though other opaque material may be used, and consists of an overhanging portion 20 which springs from substantially the upper half of the periphery of the door 13 or glass 12 forward in a semi-dome, which has a central portion 21 which extends below the center of the glass 12 by perhaps one-fifth ($\frac{1}{5}$) or more of the radius thereof and is spaced from the glass 12 by perhaps half the diameter of the latter, the bottom edge 22 of this projecting part of the hood 20 being curved under the portion 21 and cut away at the sides 23 to points slightly above the center of the glass 12, as is clear from Fig. 2. The hood 20 is fastened to the door 13 by being provided with a flange 25 which extends in a complete circle and is located between the flange 16 and the glass 12 so that it will be clamped in place by the spring ring 18 which clamps the glass in place, the flange 25 conveniently being split at the bottom, at 26, to allow it to be adjusted somewhat for lamps of slightly different size. The flanges 16 and 25 preferably interlock, as shown in Fig. 1.

In operation, the forwardly projected rays from the lamp 10 pass through the glass 12, and those which are leading downward pass under the edge 22 of the hood 20 while those which are leading upward strike such hood and are deflected downward toward the ground; and the rearwardly projected rays from the lamp strike the reflector 11 and are reflected forward in substantially parallel lines through the glass 12, the lower ones of these rays passing beneath the lower edge 22 of the hood 20 to light up the road ahead while the upper part of these rays strike the hood 20 and are deflected downward thereby upon the road directly in front. Thus the light rays which would pass forward and upward are cut off, and as it is these rays which produce the blinding effect upon persons ahead such blinding effect is eliminated; while the rays which proceed forward and downward are permitted to pass unhindered, and as it is these rays which produce the lighting of the road ahead such lighting is in nowise diminished. Because of the divergence of the forward rays from the lamp 10, it is desirable that the hood 20 be substantially forward of the glass 12, as otherwise many upward rays would succeed in passing under the lower edge of the hood and would strike the eyes of the persons ahead, but this is prevented by having the central portion 21 of the hood forward of the glass by a distance substantially equal to the radius of the latter. The cut-away portions 23 at the sides of the hood permit the passage of sideward rays to light up the sides of the road, both on the ground and somewhat above it, so that the driver may see if persons or objects are approaching the road from the side.

The hood embodying my invention may be applied to most ordinary headlights by merely removing the glass and its retaining means therefrom, inserting the hood from the rear, and replacing such glass and retaining means; and the hood is held firmly in place by the same retaining means which holds the glass in place.

If desired, a translucent button 30 may be inserted in the central portion 21 of the hood, preferably directly in the line of the axis of the lamp. This button may be of colored glass. By making these buttons 30 on the two headlights of different color, preferably green for the right and red for the left as in the generally accepted signal code, it is possible for those in front of the automobile to tell which headlight has been extinguished in case only one headlight is burning. Thus if only the green headlight is burning, the person in front can determine at once that the bulk of the car as he is looking at it is toward the right of such light, and may make his allowance accordingly.

The hood 20 not only serves effectively as a glare guard, permitting the headlight to light up the road ahead while keeping the glare out of the eyes of other drivers and pedestrians, but also serves effectively as a weather guard, to protect the glass 12 from sun and rain.

I claim as my invention:

1. In combination, a headlight, and an opaque hood for said headlight comprising a dome-like portion which is fixed relatively to the headlight and extends in front of the upper portion of the light-emitting opening of the headlight and has the center part of its lower edge above the bottom but below the center of such opening and side parts of its lower edge above such center of such opening, said central portion being spaced in front of such opening by a distance not less than half the diameter of the opening.

2. In combination, a headlight, and an opaque hood for said headlight comprising a dome-like portion which is fixed relatively to the headlight and extends in front of the upper portion of the light-emitting opening of the headlight and has the center part of its lower edge above the bottom but below the center of such opening, said central portion being spaced in front of such opening by a distance not less than half the diameter of the opening.

3. In combination, a headlight, and an opaque hood for said headlight comprising a dome-like portion which is fixed relatively to the headlight and extends in front of the upper portion of the light-emitting opening of the headlight and has the center part of its lower edge above the bottom but below the center of such opening and side parts of its lower edge above such center of such opening.

4. In combination, a headlight, and an opaque hood for said headlight comprising a dome-like portion which is fixed relatively to the headlight and extends in front of the upper portion of the light-emitting opening of the headlight and has the center part of its lower edge above the bottom but below the center of such opening.

5. In combination, a headlight, and an opaque hood for said headlight comprising a dome-like portion which is fixed relatively to the headlight and extends in front of the upper portion of the light-emitting opening of the headlight and has the center part of its lower edge above the bottom but below the center of such opening, and a translucent button mounted in said dome slightly above the central part of its lower edge.

6. As an article of manufacture, a glare guard for automobile headlights comprising a split ring, and a dome-like portion fixed on substantially the upper half of such ring and projecting forward out of the plane thereof with the center portion of its lower edge below the axis of such ring by less than the radius thereof and side portions of its lower edge above such axis.

7. As an article of manufacture, a glare guard for automobile headlights comprising a split ring, and a dome-like portion fixed on substantially the upper half of such ring and projecting forward out of the plane thereof with the center portion of its lower edge below the axis of such ring by less than the radius thereof.

8. As an article of manufacture, a glare guard for automobile headlights comprising a split ring, and a dome-like portion fixed on substantially the upper half of such ring and projecting forward out of the plane thereof with the center portion of its lower edge below the axis of such ring by less than the radius thereof, the dome at the central portion of its lower edge being spaced from the plane of the ring by a distance at least as great as the radius thereof.

9. In combination, an automobile headlight comprising a source of light, a reflector behind the source of light, a glass in front of the source of light, an inwardly projecting flange in front of the glass at its edge, means behind the glass for holding it against such flange, and a glare guard projecting in front of the upper portion of the glass and having a flange for insertion between the first-named flange and the glass.

10. In combination, an automobile headlight comprising a source of light, a reflector behind the source of light, a glass in front of the source of light, an inwardly projecting flange in front of the glass at its edge, means behind the glass for holding it against such flange, and a glare guard projecting in front of the upper portion of the glass and having a flange for insertion between the first-named flange and the glass, said two flanges interlocking with each other.

11. As an article of manufacture, a glare guard for automobile headlights, comprising a ring which is split so that it may be bent to different radii, said ring being provided with an outwardly projecting flange for projecting between the glass and the holding flange of the headlight, and a dome-like portion carried by and projecting in front of the upper part of such ring.

12. As an article of manufacture, a glare guard for automobile headlights, comprising a ring, said ring being provided with an outwardly projecting flange for projecting between the glass and the holding flange of the headlight, and a dome-like portion carried by and projecting in front of the upper part of such ring.

13. As an article of manufacture, a glare guard for automobile headlights, comprising a ring, said ring being provided with an outwardly projecting flange for projecting between the glass and the holding flange of the headlight and said first-named flange being provided with a portion for interlocking with said holding flange of the headlight, and a dome-like portion carried by and projecting in front of the upper part of such ring.

14. As an article of manufacture, a glare guard for automobile headlights, comprising a dome-like portion for extending in front of the upper portion of the light-emitting opening of a headlight and provided with an outwardly projecting flange for projecting between the glass of such headlight and the flange which holds such glass in place.

15. As an article of manufacture, a glare guard for automobile headlights, comprising a dome-like portion for extending in front of a portion of a light-emitting opening of a headlight and a portion for projecting between the glass of such headlight and the flange which holds such glass in place.

In witness whereof, I have hereunto set my hand at Indianapolis, Indiana, this twentieth day of August, A. D. one thousand nine hundred and fourteen.

FREDERICK W. BEAUCHAMP.

Witnesses:
 JOSEPHINE GASPER,
 G. B. SCHLEY.